US012619407B2

(12) United States Patent
Jin et al.

(10) Patent No.: US 12,619,407 B2
(45) Date of Patent: May 5, 2026

(54) METHOD AND APPARATUS FOR COMPUTER OPERATION IMPROVEMENT BY FLATTENING MULTI-LEVEL DATA STRUCTURES TO OPTIMIZE POINTER CHASE

(71) Applicant: HUAWEI TECHNOLOGIES CO., LTD., Shenzhen (CN)

(72) Inventors: Hao Jin, Kanata (CA); Mehrnoosh Heidarpour, Kanata (CA); Ehsan Amiri, Kanata (CA); Bryan Pak Kwai Chan, Kanata (CA); Yibo Yu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 18/545,309

(22) Filed: Dec. 19, 2023

(65) Prior Publication Data

US 2024/0220219 A1     Jul. 4, 2024

Related U.S. Application Data

(60) Provisional application No. 63/435,855, filed on Dec. 29, 2022.

(51) Int. Cl.
*G06F 8/41*          (2018.01)
(52) U.S. Cl.
CPC .................................. G06F 8/4442 (2013.01)
(58) Field of Classification Search
CPC .......... G06F 8/41; G06F 8/443; G06F 8/4441; G06F 8/4442
See application file for complete search history.

(56) References Cited

U.S. PATENT DOCUMENTS

| | | | |
|---|---|---|---|
| 8,069,311 B2 * | 11/2011 | Sun ..................... | G06F 12/0862 |
| | | | 711/213 |
| 8,239,841 B2 * | 8/2012 | Chen ..................... | G06F 8/4442 |
| | | | 717/140 |

(Continued)

OTHER PUBLICATIONS

Yulei Sui, Hua Yan, Zheng Zheng, Yunpeng Zhang, Jingling Xue, Parallel construction of interprocedural memory SSA form. Journal of Systems and Software, vol. 146, 2018, pp. 186-195.

(Continued)

*Primary Examiner* — Marina Lee

(57)          ABSTRACT

A method and apparatus for computer operation improvement by flattening multi-level data structures to optimize pointer chase is provided. Within computer program code, one or more chains of multiple pointers which ultimately reference stored information to be processed are identified. These chains are analyzed to determine the feasibility of replacing the chains with a flatter data structure. In the flatter data structure, the stored information is accessible more directly. For example the data may be stored in a single array by which it can be accessed directly. When feasible, a chain is replaced with such a data structure and the computer program code is adjusted to implement the improved data structure in place of the associated chain. Candidate chains can be identified or prioritized for example on the basis of the expected impact to computer performance, e.g. in terms of operating speed or resource usage.

15 Claims, 10 Drawing Sheets

(56)            References Cited

U.S. PATENT DOCUMENTS

| | | | |
|---|---|---|---|
| 8,826,253 B2 * | 9/2014 | Hernandez Porras | .. G06F 8/443 |
| | | | 717/154 |
| 2020/0285453 A1 * | 9/2020 | Sethuraman | .......... G06F 8/4434 |

OTHER PUBLICATIONS

Peng Zhao, Shimin Cui, Yaoqing Gao, Raul Silvera, Jose Nelson Amaral, Forma: A Framework for Safe Automatic array reshaping. ACM Trans. Program Lang. Syst. 30, 1, Article 2 (Nov. 2007), 30 pages.

Golovanevsky, Olga, and Ayal Zaks. "Struct-reorg: current status and future perspectives." Proceedings of the GCC Developers' Summit. Citeseer, 2007.

Sam Ainsworth , Timothy M. Jones "Graph Prefetching Using Data Structure Knowledge" ICS '16, Jun. 1-3, 2016.

Amir Roth, Andreas Moshovos, Gurindar S. Sohi. "Dependence Based Prefetching for Linked Data Structures", ASPLOS VIII: Proceedings of the eighth international conference on Architectural support for programming languages and operating systems. Oct. 1998, pp. 115-126.

Sam Ainsworth et al., "Software Prefetching for Indirect Memory Accesses", CGO '17: Proceedings of the 2017 International Symposium on Code Generation and Optimization. Feb. 2017, pp. 305-317.

M. Karlsson et al., "A prefetching technique for irregular accesses to linked data structures", Proceedings Sixth International Symposium on High-Performance Computer Architecture. HPCA-6 (Cat. No.PR00550), Jan. 8 to 12, 2000.

Khan, M. A. "Optimization Study for Multicores" (Dissertation), Uppsala University, Disciplinary Domain of Science and Technology, Mathematics and Computer Science, Department of Information Technology, Aug. 2009.

Harmen L. A. van der Spek et al., "Automatic restructuring of linked data structures". Published in LCPC'09: Proceedings of the 22nd international conference on Languages and Compilers for Parallel Computing. Oct. 2009. pp. 263-277.

Lufei Liu et al., "Intersection Prediction for Accelerated GPU Ray Tracing". MICRO '21: MICRO-54: 54th Annual IEEE/ACM International Symposium on Microarchitecture. Oct. 2021. pp. 709-723.

* cited by examiner

```
210
class A {
    B* b;
};
```

```
220
class B {
    C* c;
};
```

```
230
class C {
    std::vector<D *> d_vector;
};
```

```
240
class A2 {
    B* b;
    D** array_of_d;
};
```

500

```
class A {
    B* b;
    void search(A* Other, int Size){
        for (size_t i=0; i < Size; i++)
        {
            if (b->c->d_vector[i] == other->b->c->d_vector[i])
            {
                printf("Fount a match in index %u.", i);
                return;
            }
        }
        return;
    }
};
```

FIG. 5

```
for.body:                                  ; preds = %for.cond
  %b = getelementptr inbounds %class.A, %class.A* %this1, i32 0, i32 0
  %2 = load %class.B*, %class.B** %b, align 8
  %c = getelementptr inbounds %class.B, %class.B* %2, i32 0, i32 0
  %3 = load %class.C*, %class.C** %c, align 8
  %d_vector = getelementptr inbounds %class.C, %class.C* %3, i32 0, i32 0
  %4 = load %struct.D**, %struct.D*** %d_vector, align 8
  %5 = load i64, i64* %i, align 8
  %arrayidx = getelementptr inbounds %struct.D*, %struct.D** %4, i64 %5
  %6 = load %struct.D*, %struct.D** %arrayidx, align 8
```

Determine optimization candidate 910

Generate replacement data structure 920

Analyse memory location mod/ref 930

Determine shapes of cache 940

Allocate cache 950

Generate computer code 960

METHOD AND APPARATUS FOR COMPUTER OPERATION IMPROVEMENT BY FLATTENING MULTI-LEVEL DATA STRUCTURES TO OPTIMIZE POINTER CHASE

CROSS-REFERENCE TO RELATED APPLICATIONS

This application claims the benefit of U.S. Provisional Application Ser. No. 63/435,855, titled "Method and Apparatus for Computer Operation Improvement by Flattening Multi-Level Data Structures to Optimize Pointer Chase" filed on Dec. 29, 2022, which is incorporated by reference herein in its entirety.

FIELD

The present disclosure pertains to the field of computer operations, and associated methods, apparatus and system and in particular to method apparatuses for computer operations for memory access which includes pointer chase.

BACKGROUND

Computers generally operate by having a computer processor (CPU) obtain instructions and data stored in memory. The data is operated on according to the instructions, and results can further be stored to memory. These memory accesses are a well-known bottleneck for computer programs, because memory access speed is typically less than CPU speed. Caching is a well-known mechanism to address this issue. Data or instructions can be held in a limited computer memory located close to the CPU and accessible at high speeds. Multiple levels of caches can be provided and maintained, depending on a computer's architecture.

FIG. 1 illustrates an example of a computing architecture in which a processor 110 interacts with multiple levels of memory to retrieve and store instructions, data, or both. The levels of memory include the L1 cache 120, L2 cache 130, L3 cache 140 and main memory 150. The L1 cache 120 is the smallest but most rapidly accessible by the processor 110. The L2 cache 130, L3 cache 140 and main memory 150 are progressively larger but have longer access times.

To take advantage of caching, programs should ideally exhibit a property called locality, which may be defined such that a program should access the same memory location in very short time intervals (e.g. temporal locality) or access memory locations close to the memory that was recently accessed (e.g. spatial locality).

Many programs lack data locality, which results in significant performance degradation. Compilers have developed various techniques that deal with this issue and aim to improve data locality of the program. Many loop optimization techniques fall in this category. These optimizations attempt to restructure loops in the program to improve data locality and hence speed up the program. These optimizations generally do not change how the program data is laid out on the memory, instead they change the order of execution of program statements so that locality is improved. Referring back to FIG. 1, non-locality may require data to be accessed in a variety of locations. This may lead to a lot of L1 and L2 cache misses, requiring a program to read from the L3 cache 140 or main memory 150, thus slowing operation.

A second group of compiler optimizations to deal with this issue is called data-layout optimizations. Data-layout optimizations attempt to determine how a program lays out its data on the memory and identify ways to change the data-layout in a way that increases program speed. A well-known family of optimizations in this class is known as structure peeling or structure splitting. These optimizations change aggregate data types in the program (such as the "struct" construct in the C programming language) in one of the following manners. In a first manner, an array of "struct" is broken into multiple arrays (e.g. a structure of arrays), each containing a smaller "struct" that includes one or more of the fields of the original "struct". In another manner, fields of the "struct" are re-ordered such that the fields that are accessed in the same loop or region of the program are close to each other.

Another type of data layout optimization deals with arrays of scalars and aims to change the order in which elements are stored in the array.

The above-identified optimizations are known in the compiler-optimization community due to their impact on important industry-standard benchmarks.

Other approaches may use prefetching to speed up access to memory when facing locality issues. This may be provided either as an enhancement in hardware prefetch technology or in software prefetch techniques, or a combination of both.

There are also hardware techniques that take advantage of execution traces of a program as seen so far. These techniques attempt to extract some relevant information from the traces and use it while executing the rest of the program. These hardware techniques can potentially speed up access to a pointer chasing chain or other patterns of a similar nature e.g. ray tracing in GPUs.

However, the above-identified approaches can suffer from a variety of drawbacks or limitations. For example, execution traces or other runtime information may be an absolute requirement, increasing complexity. As another example, prefetching does not eliminate data loads and does not improve data locality. Rather, prefetching only attempts to overlap the data load latency with the computation by causing the hardware to start memory accesses sooner. As a result, generally techniques based on prefetching have limited performance gains. Furthermore, prefetching optimizations tend to be more tied to hardware and are more likely to require tuning for new hardware. Furthermore, prior art techniques such as those discussed above often deal with the last step of memory access in a program, thus limiting potential improvement.

Therefore, there is a need for a method and apparatus that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for computer operation improvement by flattening multi-level data structures to optimize pointer chase. Within computer program code, one or more chains of multiple pointers which ultimately reference stored information (e.g. data) to be processed are identified. These chains are then analyzed to determine the feasibility of replacing the chains with a flatter data structure. In the flatter data structure, the stored information is accessible more directly. For example, the data may be stored in a single array by which it can be accessed directly. When feasible, a chain is replaced with such a data structure and the computer program code is adjusted to implement the improved data structure in place of the associated chain. Candidate chains can be identified or prioritized for example on the basis of the expected impact to computer performance, e.g. in terms of operating speed or resource usage.

According to an aspect of the present disclosure, there is provided a method including determining, in an intermediate representation (IR) of a computer program, one or more optimization candidates, each optimization candidate comprising a chain of two or more pointers ultimately referencing information stored in memory. The method further includes generating, for the one or more optimization candidates, a replacement data structure ultimately indicative of the information stored in memory. For the one or more optimization candidates, the method further includes analyzing memory location modification and reference (mod/ref) effects to determine feasibility of the one or more optimization candidates. For the one or more optimization candidates determined to be feasible, the method further includes determining shapes for one or more caches to be associated with one or more optimization candidates determined to be feasible and allocating the one or more caches for storing the replacement data structure ultimately indicative of the information stored in memory. The method further includes generating computer code to write to, read from, or both write to and read from the one or more caches.

In some embodiments, determining of one or more optimization candidates is performed using a cost model or cost analysis which can be indicative of one or both of: the amount or frequency of usage of code involving the one or more optimization candidates and the potential for performance improvement resulting from using the replacement data structure in place of the one or more optimization candidates.

In some embodiments, analyzing memory location modification and reference (mod/ref) effects includes a pointer analysis. In some embodiments, analyzing memory location modification and reference (mod/refs) effects further includes evaluating load instructions. In some embodiments, determining shapes for one or more caches further includes determining a size of the one or more caches.

In some embodiments, the one or more optimization candidates form a flattened tree structure. In some embodiments, the method further includes determining dimensions and size associated with the flattened tree structure.

According to an aspect of the present disclosure, there is provided an apparatus including a processor and a memory having machine executable instructions stored thereon. The instructions when executed by the processor configure the apparatus to perform one or more of the above methods or methods further discussed elsewhere herein.

Various aspects of the present disclosure provide for methods, apparatus and computer program products (comprising computer readable media). It is considered that such an apparatus may be a computer configured to perform various operations of an associated method as described herein, and similarly such a method may be performed by a computer and may include the various operations of an associated apparatus as described herein. Similarly, such a computer program product may contain stored thereon statements and instructions which, when executed by a computer, may cause the computer to implement an associated method as described herein, or configure the computer to be or operate as an associated apparatus as described herein, or both.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be readily apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 5 illustrates example source code related to identifying pointer chase, according to an embodiment of the present disclosure.

FIG. 6 illustrates an intermediate representation of relevant portions of source code, according to an embodiment of the present disclosure.

It will be noted that throughout the appended drawings, like features are identified by like reference numerals.

DETAILED DESCRIPTION

Unless defined otherwise, all technical and scientific terms used herein have the same meaning as commonly understood by one of ordinary skill in the art to which this invention belongs. The numbers and numbers combined with letters correspond to the component labels in all the figures.

The term "pointer" is used to define a kind of reference, and a pointer can be considered to reference a datum stored somewhere in memory. To obtain that datum is to dereference the pointer. A pointer's value is meant to be interpreted as a memory address.

The term "pointer chasing chain" refers to a sequence of pointers loaded in succession. Each pointer of the sequence of pointers is the result of an immediately preceding loaded "pointer".

The term "root" in the context of a pointer chasing chain refers to the first pointer in the chain. It is noted that, in C++, because pointer "this" can be eliminated, sometimes the root of a chain may be implicit.

The term "tree" refers to a special form graph data structure.

The term "flattened tree" refers to a tree with fewer levels than the tree upon which it is based. This term is typically used in a context that a flattened tree is the result of processing another tree with a larger number of levels.

The term "cost model" refers to an analysis or associated utility to determine whether a particular transformation is "profitable" (or advantageous) or not, and possibly the level of "profitability". It is to be understood that profitability in this context may refer to decreasing the running time of a program.

Embodiments of the present disclosure relate to a method and apparatus for computer operation improvement by flattening multi-level data structures in order to optimize pointer chase. The pointer chase occurs as a result of computer program code to be executed by a computer. The apparatus can be the same computer which is to execute the computer program code, or a different computer. The method is also performed using such a computer. Embodiments of the present disclosure may be provided as part of a computer program code compiler, or a computer which executes such a computer program code compiler.

Figure 1:
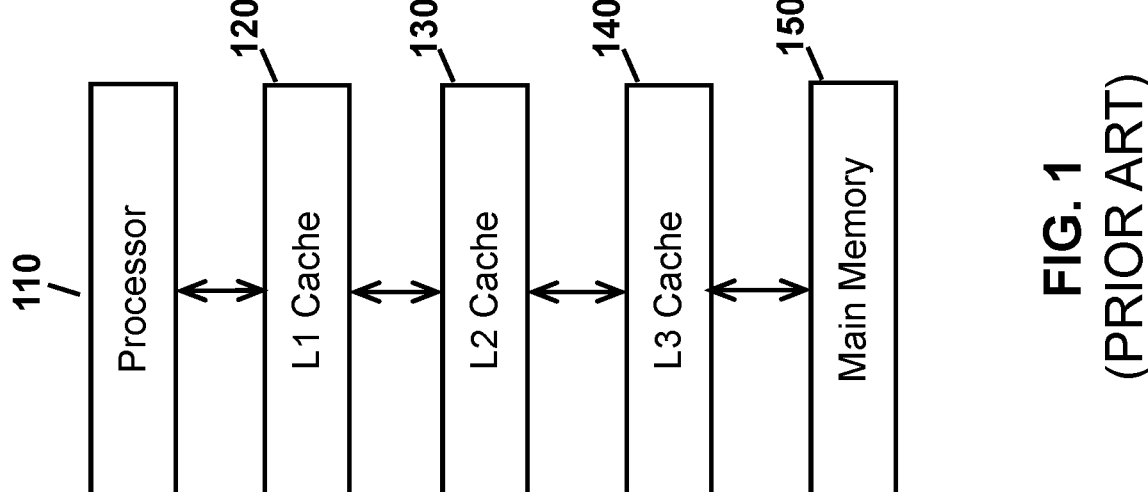
FIG. 1 illustrates an example of a computing architecture according to the prior art.
Figures 2A, 2B:
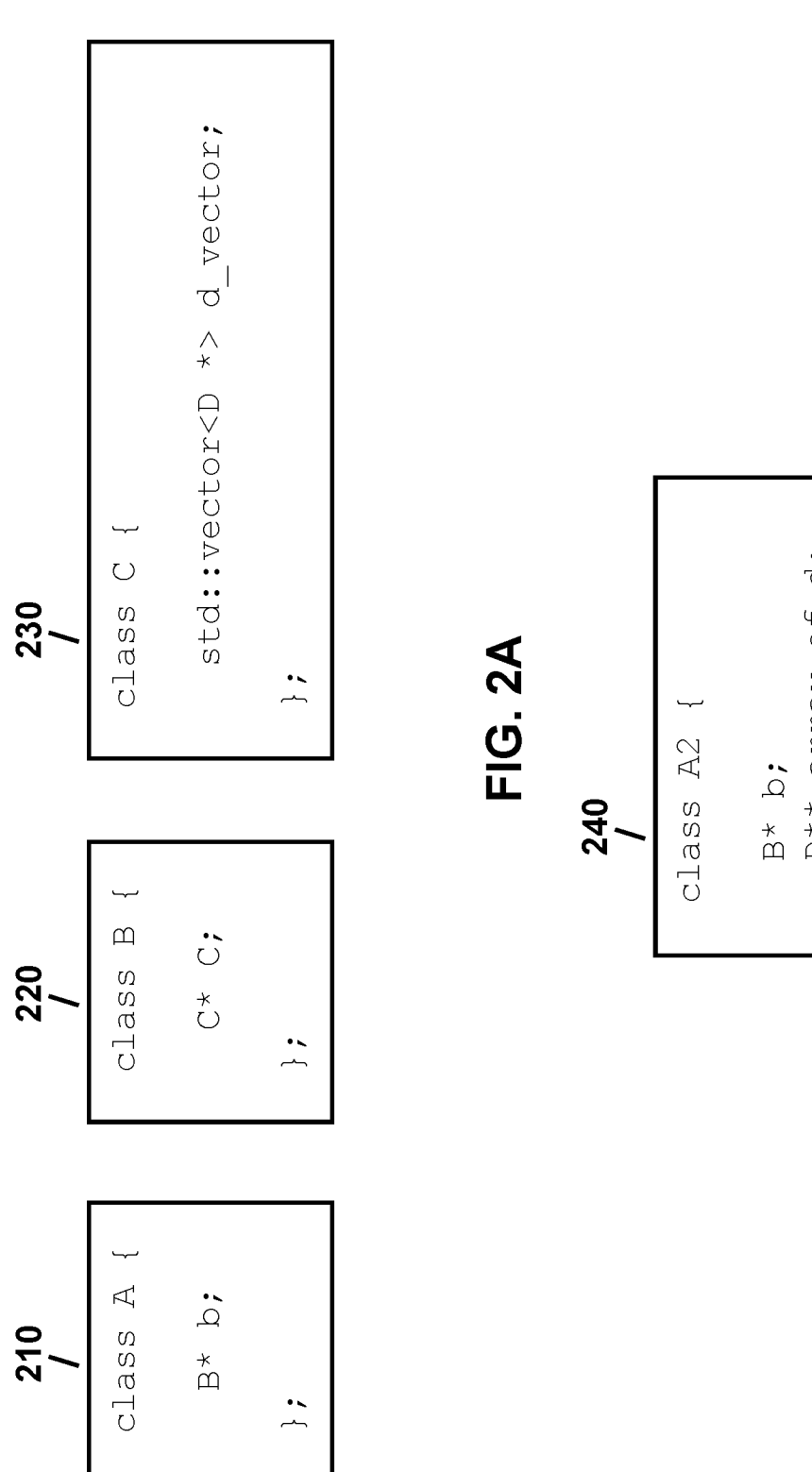
FIG. 2A illustrates a set of nested pointer objects to be operated upon in accordance with an embodiment of the present disclosure.
FIG. 2B illustrates a new object class which is created in accordance with an embodiment of the present disclosure.

Embodiments of the present disclosure deal with memory that is accessed through a pointer chasing chain. For example, in C++ programs it is a common pattern to have a set of nested pointers to objects or data. FIG. 2A illustrates, by way of example, three pointer objects 210, 220, 230. These pointer objects are nested in the sense that pointer object 210 refers to pointer object 220, which refers to pointer object 230. For example, having regard to pointer object 210, for class A it would be understood that "B* b;" declares "b" as a pointer to the type determined by declaration specifier (decl-specifier-seq) "B". Furthermore, having regard to pointer object 220, for class B it would be understood that "C* c;" declares "c" as a pointer to the type determined by decl-specifier-seq "C".

According to embodiments, a program may contain code patterns such as the one described above with respect to FIG. 2A. While this example has single pointers of type B* and C*, it will be readily understood by a worker skilled in the art that in practice there might be an array of each of these pointers.

Depending on the allocation pattern in the code, the locality of the accessed data could be low. This implies that there might be significant performance degradation due to stalls when executing memory accesses such as *a->b->c->d_vector[i]. In cases where b points to an array of pointers to B objects, the access code can be defined as follows: *a->b[k]->c->d_vector[i].

Embodiments of the present disclosure deal with the different steps that a compiler takes in order to perform this transformation. These different steps can include one or more of a cost analysis, a legality analysis and a transformation of the code.

According to some embodiments of the present disclosure, the method may transform the program of the above example such that class A above is modified to class A2 240 as shown in FIG. 2B. In the example represented by class A2, the assumption is that b does not point to an array, but is a single pointer. This issue will be discussed in detail elsewhere herein. The vector of pointers to D is moved or copied to class A2 from their original location. This implies that the number of intervening loads in the pointer chain, and associated locality issues, are expected to be reduced. In this case, even if there is no locality, the elimination of the load itself constitutes an optimization.

In some embodiments, locality can be improved as follows. Data in an array as defined in class A2 may be contiguous or more contiguous in memory. The various intermediate pointers along a chain (which may be stored at significantly different memory locations) are not required or are less often accessed during operation, namely execution of the code. This mitigates the number of non-local data accesses. The overall number of loads (e.g. of intermediate pointers) can also be reduced.

Another implication is as follows. Note that the pointer to class B, may actually point to an array of pointers to B objects. It is likely that objects in this array are allocated at different points of time in the program and namely would be accessed at different times during execution of the program code. Even if these objects are allocated at the same time and have a regular layout in memory, each of them contains a pointer to an object C. This could be another source of insertion of irregularity in memory layout of D* pointers that the program is to access. It is likely that C objects are allocated at different times during the program, possibly depending on some condition. The C objects may turn out to be irregularly distributed in memory and so their addresses may turn out to be hard to predict for a hardware prefetcher. It is understood that a hardware prefetcher is a data prefetching technique that is implements as a hardware component in a processor. It is further understood that prefetching as performed by a prefetcher is an action that a component of a memory manager which may speed up the operation of the program by shortening the amount of time it takes to start up the program. The longer the pointer chain, the more likely it is that some level of the chain introduces irregularity and results in some or all of the data loads from memory starting from that point in the program on (e.g. from the point of the irregularity), to have hard-to-predict addresses and may have a high risk of a cache miss.

Embodiments of the present disclosure may be applicable in scenarios which contain a code pattern as described above.

Embodiments of the present disclosure include some or all of the following components. These components are described further for example with respect to FIG. 8. The components include a cost model to identify potential candidates to be operated upon. The components include a legality analysis component. The legality analysis component includes a sub-component configured to identify all loads and stores to memory addresses of interest. The legality analysis component can include another sub-component configured to determine the shape of flattened tree nodes. The components include a code generation component that is configured to perform tasks including allocation of the flat tree nodes and modifying the load and store accesses to the original data. The components may also include a pointer analysis component. The pointer analysis component may be used by the cost model, the legality analysis component, or both. Further details of a pointer analysis component may be readily understood by a worker skilled in the art. For example, pointer analysis can create an abstract representation of memory. In this abstract representation the memory is partitioned into a number of segments.

Then the pointer analysis can answer the following question, for each pointer in the program, which segments in the abstract representation of memory can the pointer possibly point to.

Figure 3:
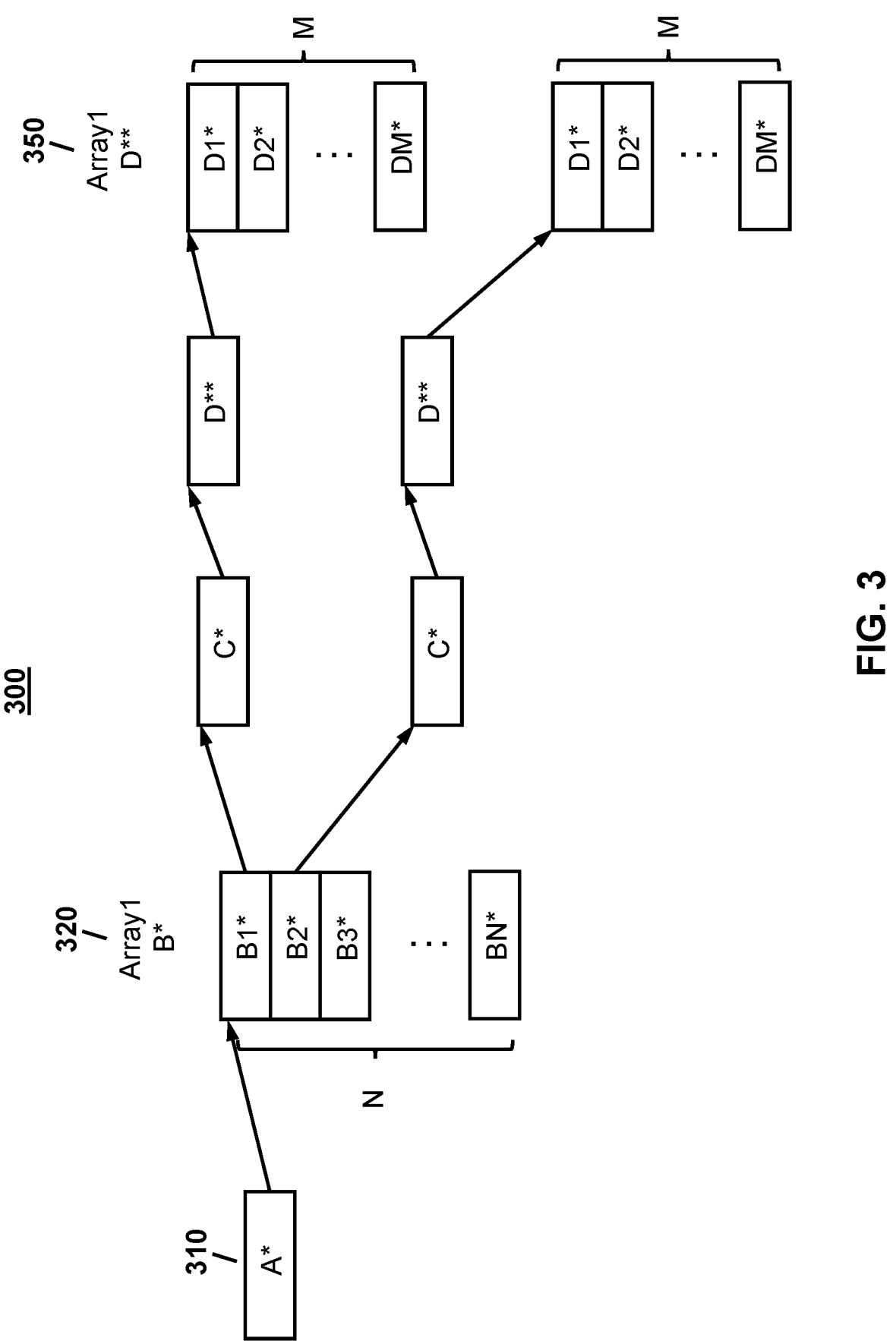
FIG. 3 illustrates a tree-like data structure to be identified and operated upon in accordance with an example embodiment of the present disclosure.

Embodiments of the present disclosure operate to provide what is referred to herein as a flattened tree. Consider the example of FIGS. 2A and 2B. Before transformation, the nested objects can be viewed as a tree (e.g. a type of graph) where the root is the object of class A. The root has one or more children, depending on whether b is a single pointer or an array of pointers. The next level of the tree will be pointers to class C, and so on. FIG. 3 schematically illustrates an example of such a tree 300.

Figure 4:
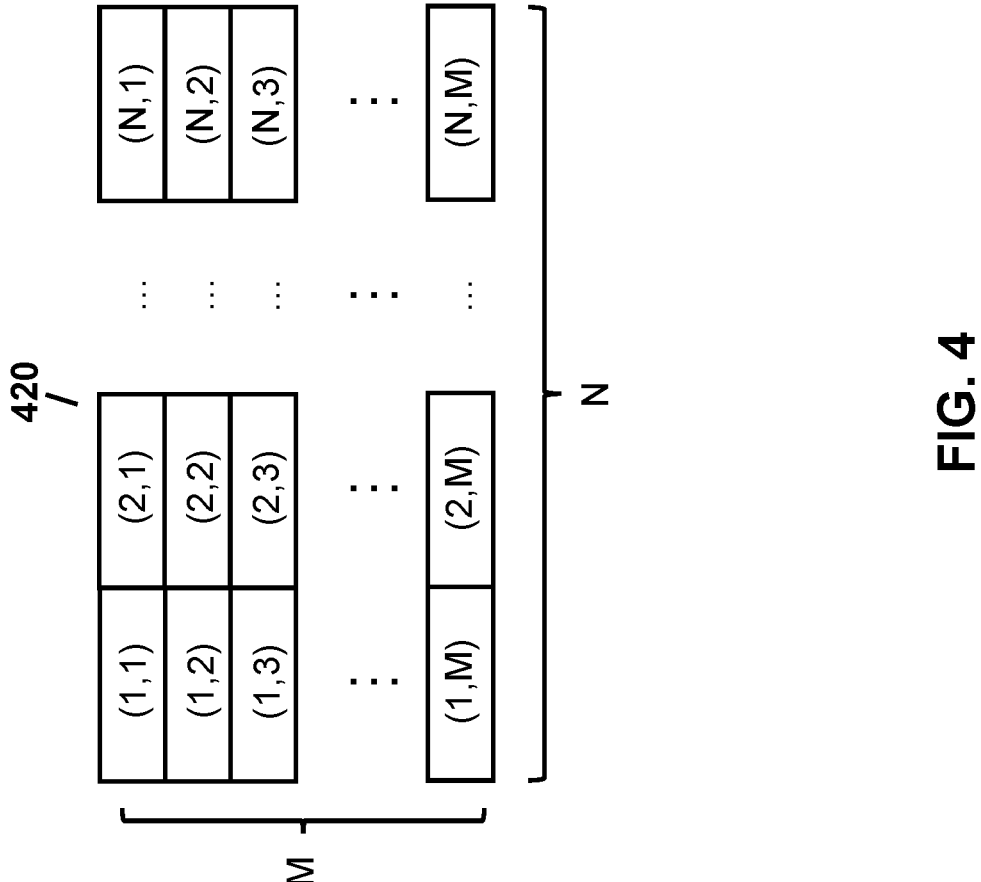
FIG. 4 illustrates a new data structure which is created in accordance with an embodiment of the present disclosure to replace the data structure of FIG. 3.

In comparison, after transformation, a "flattened tree" data structure is provided which has two levels, e.g. fewer levels of the tree than the levels of the set of nested objects illustrated in FIG. 3. This is the reason behind the name "flattened tree". In the example of FIG. 4, the flattened tree 420 includes a root, which is an object of class A. The flattened tree also includes all D* pointers owned by this object. While b is still a member of A, it may have little to no relevance after the transformation. The flattened tree 420 of FIG. 4 will be a member object of class A. The object of class A can be considered as the root of a two-level tree. Each element of this array can be considered as a leaf of that tree. The element with index (i, j) corresponds to the path (e.g. in FIG. 3) that starts from the object of class A, goes through B_i pointer and ends in the D_j pointer. Expressed another way, index (i, j), includes a chain of pointers, starting from the object of class A, going through B_i pointer and ending at the D_j pointer. The D_j pointer is ultimately indicative of information stored in memory, as D_j pointer is a reference to a datum stored in memory, wherein the pointer's value can be interpreted as a memory address.

FIG. 5 illustrates a segment 500 of source code which may be implemented according to an embodiment of the present disclosure. This source code includes the pointer chase, the actions of which are as discussed above. FIG. 6 illustrates LLVM intermediate representation (IR) 600 associated with relevant portions of this source code. As would be understood LLVM is a collection of modular and reusable compiler and toolchain technologies.

According to embodiments, the cost model may use techniques such as profiling or static heuristics to determine that optimizing a selected part of the code is worthwhile. This may include, for example, determining that the selected part of the code is "hot" i.e. accessed significantly often. This may include, for example, determining that optimizing this selected part of the code will result in a significant performance gain or improvement.

According to embodiments, subsequently, by performing a use-def analysis, the cost model can identify %4 and %6 (as shown in FIG. 6) as potential candidates for optimization. The use-def analysis may be carried out for example similarly to those which would be readily understood by a worker skilled in the art. For example, use-def analysis can be considered as a standard concept in a compiler, wherein for a given definition in the program, use-def analysis returns all uses of the value in the code. Furthermore, for a given use, the use-def analysis will return the point in the program where the value is defined.

Figure 7:
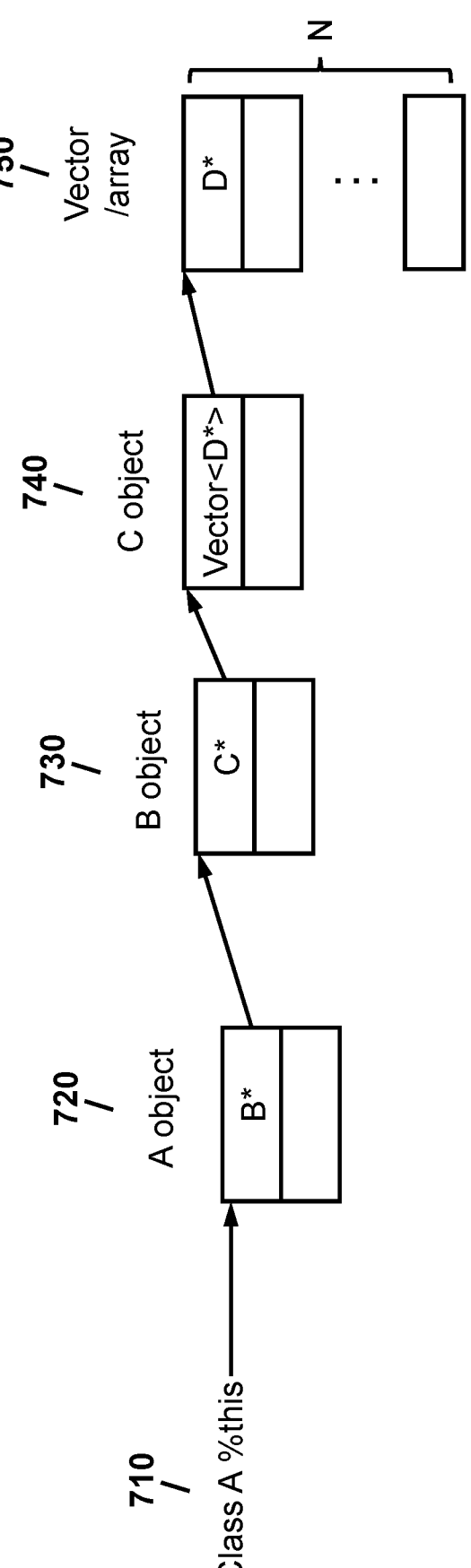
FIG. 7 illustrates a tree-like data structure to be identified and operated upon, in accordance with another example embodiment of the present disclosure.

According to embodiments, the cost model may utilize a strong pointer analysis utility in order to connect pointers to their allocation sites. Standard techniques can be used to identify the data type of the objects involved. The overall tree structure defined by the code in this example can be displayed as illustrated in FIG. 7.

If such a multi-level data structure is free of cycles, it can be viewed as a tree with the object of type A as its root. In this example all intermediate nodes 720, 730, 740 of the tree are singular, i.e. they contain only a pointer to another object, and only the tree's leaf 750 is an array. In the more general case, nodes in the tree may contain several other fields with different times and one or more of the nodes can be either singular or an array. The arrays can be of a consistent runtime size and the runtime size could be fixed or dynamically adjustable (e.g. C++ stdlib vectors). FIG. 3 illustrates a more complicated scenario than FIG. 7. For example, in FIG. 3, there is a single object B 720 as illustrated in FIG. 7. However, as illustrated in FIG. 3 there is an array 320 of B's, which can result in the further complexity of this scenario when compared to the scenario illustrated in FIG. 7.

Embodiments of the present disclosure include a legality analysis. This legality analysis may include identifying loads (e.g. retrievals of data from memory) and stores (e.g. writing of data to memory).

Such embodiments generally utilize a pointer analysis component. Starting with an initial set of pointer chases that are candidates for optimization, embodiments identify all stores to the relevant memory locations that is accessed by this pointer chasing chain. This may be referred to herein as "accessed memory". Existing standard techniques may be used for this purpose. For instance, the LLVM compiler builds an intra-procedural memory static single assignment (memory SSA) to address this issue within the scope of one function. Similarly, an inter-procedural memory SSA, or an equivalent or similar resource, may be used herein. A worker skilled in the art would readily understand how to construct an inter-procedural memory SSA. For example, such a technique is described in "Parallel construction of inter-procedural memory SSA form," "Y. Sui et al., Journal of Systems and Software, December 2018. It is to be readily understood that other techniques may also be used for the construction of an inter-procedural memory SSA.

According to some embodiments, it is considered possible that all data stores of the accessed memory may not be identifiable, for example because the pointer analysis component determines that a pointer to a location in accessed memory is passed to an external function. In this case, the analysis can be declared to have failed, and further processing (for example transformations) with respect to the currently considered pointer chase, may be aborted. Otherwise, it can be considered that the set of all data stores can be partitioned into three subsets. According to embodiments, the "selected load" refers to the last pointer load in the pointer chase loads that is identified by the cost model as a candidate for transformation. It is to be noted that this is the last memory access in the pointer-chasing chain under analysis. Then, for a given load from a given memory location (ML) in the accessed memory, the set of all data stores of the program can fall into three possible categories, a first category, a second category and a third category, which can be defined as follows:

According to embodiments, a first category indicates stores that definitely alias (must-alias) the given ML, and which are sources of a true dependence of this particular load. It is noted as being readily understood that two pointers pointing to the same memory location are known as aliases of each other. Furthermore, as an example, a true dependent can be interpreted as follows: instruction A has a true dependence on instruction B if: instruction B is executed first and writes to some memory address X and instruction A is executed later and instruction A reads memory address X.

According to embodiments, a second category indicates stores that may alias ML, and which may possibly be sources of a true dependence of this particular load.

According to embodiments, a third category indicates other stores, namely stores which either do not alias ML or are not source of a true dependence of this particular load.

In various embodiments, it can be required that any store, to any memory location that is an intermediate node in a pointer chase, falls into the third category. These stores may be stores to a node that is neither the root node nor the node accessed by the selected load. If this configuration of the data store is not the case, transformation of the load instruction is not performed.

For selected loads, the associated one or more stores can fall in any of the three categories described above. If there are one or more stores that fall into the second category noted above, a runtime alias check is performed in association with these particular stores. It is to be understood that a runtime alias check is a process performed in order to determine if two references or pointers in a program point to the same memory location or object at the execution time of a program. If at runtime the alias does exist, then a special operational path (or code) is executed. This special operational path can be configured to handle the one or more stores that fall into the second category (and at runtime the alias exists) similarly to those stores that fall into the first category. If at runtime the alias does not exist, no change is made to the computer code that handles that particular store instruction.

According to embodiments, the handling of load instructions is described next. A transformation is made in order to change load instructions, wherein these load instructions have been identified by the cost model as being beneficial. This change or transformation converts the load instructions to new load instructions that are associated with the leaves of a flattened tree.

It is noted that there might be "other" loads in the program that is being modified which access the memory locations that the selected loads (namely the loads selected for transformation) also access. It is to be understood that there is more flexibility regarding these "other" load instructions. These "other" load instructions can be either converted to read from the flattened tree or they can remain in an unaltered form. In some embodiments, if all "other" load instructions are converted (namely converted to read from the flattened tree), then all stores to the original target memory can be removed from the program. In some embodiments, even if only some of the "other" loads are transformed (namely converted to read from the flattened tree), some of the original stores can still be eliminated from the program.

According to embodiments, a store instruction can be removed if it satisfies both of the following two conditions. The first condition is that, with respect to eliminated loads, the store instruction falls into the first category of stores. The second condition is that, with respect to all other loads, the store instruction falls into the third category of stores.

Embodiments of the present disclosure further includes dimensioning of the flattened tree leaves, as described in more detail below. Each node of a flattened tree that is generated according to an embodiment of the disclosure, may be an array or a singular object. The number of dimensions and the size of each dimension depends on the structure of the original tree from which the flattened tree is generated. According to embodiments, this information (for example the number and size of dimensions) is collected and then used during the allocation of flattened-tree nodes.

For example, consider all objects in the accessed memory excluding the first object (e.g. at a tree's root). The first object is excluded because a new flattened tree node will be a member of the first node. Consider a singular object to be a zero-dimensional array. The number of dimensions of the flattened tree node can be defined as a sum of the number of dimensions of all the objects in the access set (e.g. all objects in the accessed memory). This follows from considering that the flattened tree will have one element corresponding to each leaf of the original tree before the transformation. FIG. 4 (along with FIG. 3 for context) illustrates indexing of elements in the flattened tree 420. Each node of the flattened tree has a pair of indices (x,y). The left element "x" of the pair corresponds to the B object (of array 320) that is on the path from the root 310 of the original tree to the corresponding leaf (D* node). The right index "y" corresponds to the D* index in the corresponding D** array 350. It is considered that indices for other nodes on the path are not required at this stage, given that there is only one alternative in any other part of the path.

Generally speaking, once the above information is available, constructing the flattened tree can be performed using a compiler in a relatively straightforward manner. In this regard, it can be understood that for example, the details of the flattened tree are specified in the previously defined steps, and as such it can be a relatively simple compiler task to construct the flattened tree once a full description and details are obtained, namely obtained in the previously discussed steps.

However, it is noted that, in practice there may be different cases that require different ways of handling the details. Before describing some specific examples, three different cases that may come up in practice are further defined below.

According to embodiments, in a first case, the number of dimensions or size of some dimensions, for some of the arrays in the original tree, cannot be calculated in the right place (or location) within the program or method flattening multi-level data structures to optimize pointer chase. For example, the incorrect timing of the calculation of the number of dimensions or size of some dimensions may happen due to linearization of array access and complex code patterns caused by such linearization. In this case, according to embodiments, the optimization of pointer chase is aborted.

According to embodiments, in a second case, the number and size of all dimensions can be calculated, but due to the presence of dynamically adjustable arrays, flattening the tree will be too expensive (e.g. in terms of runtime cost of the modified program) and/or unlikely to sufficiently improve performance. However, it will be readily understood that one or more other or additional costs may be considered, for example complexity, runtime costs and resources required, to determine whether flattening multi-level data structures to optimize pointer chase is suitable. For example, there may be a negligible improvement or increased "costs" in performance of the flattened tree for pointer chase, if in a multi-dimensional array some or all dimensions need to have a dynamically adjustable size (e.g. the size of the multi-dimension array can change after the initial allocation of the required memory), then maintenance of the flattened tree will have higher runtime cost.

While in this case, the transformation according to embodiments of the disclosure can be possible, a cost-benefit evaluation may be relevant to determine whether to proceed with the transformation. In some embodiments, such a cost-benefit evaluation may be performed for example on a case-by-case basis. However, in most realistic cases, this kind of flattened tree transformation may not be beneficial. However, a possible workaround and some more details are mentioned elsewhere herein.

In accordance with embodiments, in a third case, the required quantities, for example memory storage required, are calculated or determined and a cost-benefit analysis is successful, namely that there is a runtime improvement of the program when a flattened tree is determined, then the transformation proceeds.

Some example scenarios are described in further detail below. According to embodiments, the length of an array can be determined or defined in one of the following ways: a constant, a fixed runtime value, or an adjustable runtime value (which can be considered to be similar to a vector in C++ standard library). In various embodiments, the allocation of memory for a flattened tree considers one or more of the following cases:

According to embodiments, in a first case, if all arrays are of constant size, then each node of the flattened tree is a constant-size multidimensional array.

According to embodiments, in a second case, if all arrays are of a fixed runtime size, then each node of the flattened tree is a multidimensional array with a fixed runtime size for each dimension.

According to embodiments, a third case relates to the handling of adjustable runtime sizes, and the case is typically considered more difficult. As an example, assume there are two adjustable arrays of adjustable runtime size in a pointer-chasing chain, and that the other nodes of the chain contain only scalar values. In this particular case, the flattened tree node should be a two-dimensional array. It is to be noted that in this case, size adjustment can be necessary in both dimensions. To address this potentially required dimension adjustments resulting in adjustment of memory required, one or more of the following strategies may be employed.

According to embodiments, in a first strategy, a requirement can be imposed that one or two of the array sizes have a fixed upper bound. This fixed upper bound can be used instead of an adjustable size. A runtime check may be performed to verify that accesses are within the bound. If this condition is not true at runtime, then the flattened tree nodes are not used, and instead the original data is relied upon. Details of how to verify that accesses are within the bound are provided elsewhere.

According to embodiments, in a second strategy, a two-dimensional adjustable array can be implemented. This configuration would require the use of the "memcpy" function, or a similar function to copy a block of memory, when the size is adjusted. In this instance, a cost analysis can be required or be beneficial, as mentioned previously.

Embodiments of the present disclosure, as described above, include the generation and provision of computer executable code. The above description has covered various important aspects of such code generation, including how to generate the flattened tree, and determining its dimensions and the size of each dimension. Also covered is determining which loads to replace and determining which stores to eliminate.

While it is not practically feasible to enumerate all different cases that might possibly occur in a real world application, it is considered that embodiments of the present invention can be performed for flattening a multi-level data structure to optimize pointer chase, while potentially using different standard techniques can be applied to resolve potential issues associated with certain cases.

Other aspects of code generation not explicitly discussed here may be within the purview of a person skilled in the art. For example, the skilled person may address how to pipeline the size of a given array from its current location to the location at which to define and allocate the flattened tree. Again, such issues may occur in various forms depending on the application and can be addressed as they arise.

Subsequently to the various steps described above, for example to generate computer program code portions related to flattened trees, computer program code may be modified and the code portions may be added to populate leaves of the flattened tree at write time. This modification may be required to be control flow equivalent with the corresponding store to the original location. Other details will be as readily understood by a worker skilled in the art.

Similarly, according to embodiments, the selected load instructions can be removed and replaced with one or more loads from a flattened tree. These loads can also be control flow equivalent with the loads they replace. Other details will be as readily understood by a worker skilled in the art.

Figure 8:
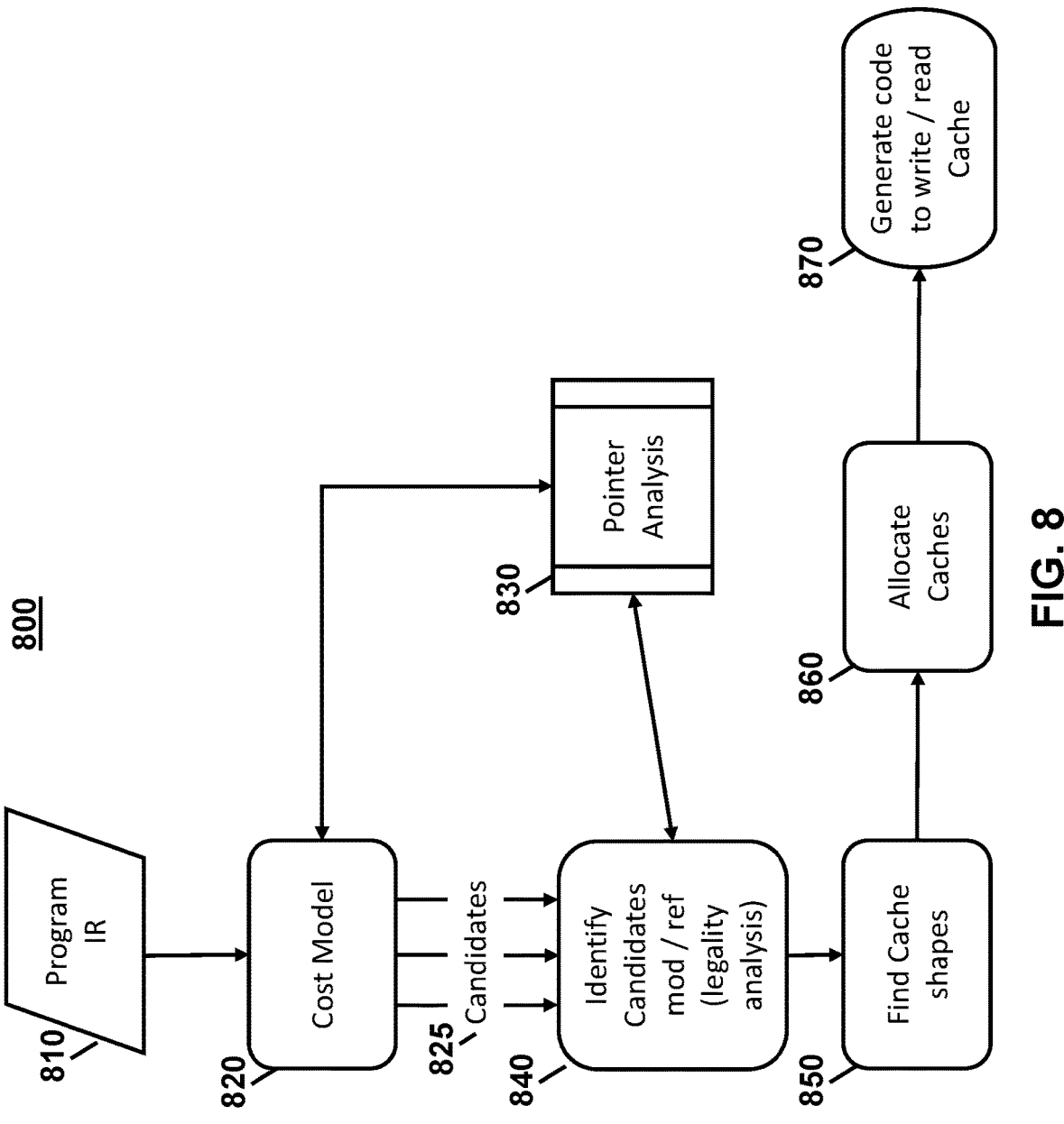
FIG. 8 illustrates operations performed according to embodiments of the present disclosure.

FIG. 8 accordingly illustrates the end-to-end flow of an implementation 800 provided according to embodiments of the present disclosure, for example as they may occur in a method or apparatus thereof. Various details are as already described above. Given a computer program IR (intermediate representation of a computer program 810, a cost model 820 is employed in order to identify pointer chase candidates which can be the subject of optimization by tree flattening. The cost model 820 may interact with a pointer analysis component (or resource, or utility) 830 as part of its operation. According to embodiments, a cost model can define an analysis or associated utility to determine if a particular transformation is "profitable" (or advantageous), and possibly further including the evaluation of the level of "profitability". It is to be understood that profitability in this context may refer to decreasing the running time of a program.

According to embodiments, the cost model then outputs the identified one or more candidates 825 to a legality analysis component 840. The legality analysis component 840 may also interact with the pointer analysis component (or resource, or utility) 830 (or with a different but comparable component) as part of its operation. The legality analysis component 840 may identify the modification and reference (mod/ref) aspects of candidates. For example, identifying loads (references (refs)) to store (modifications (mods)) can be performed with the aid of pointer analysis and inter-procedural memory SSA. According to embodiments, the legality analysis component includes a subcomponent configured to identify one or more loads and stores to memory addresses that can be of interest. The legality analysis component can include another sub-component configured to determine the shape of flattened tree nodes.

According to embodiments, for the candidates that pass legality analysis, a cache shape (and possibly cache size) determination component 850 may be employed to determine shapes of the required caches corresponding to the associated flattened tree structure. Subsequently, the caches with the required sizes and shapes are allocated 860. The code to write and read the cache is generated 870. The various operations of FIG. 8 can be performed automatically by a computer.

Figure 9:
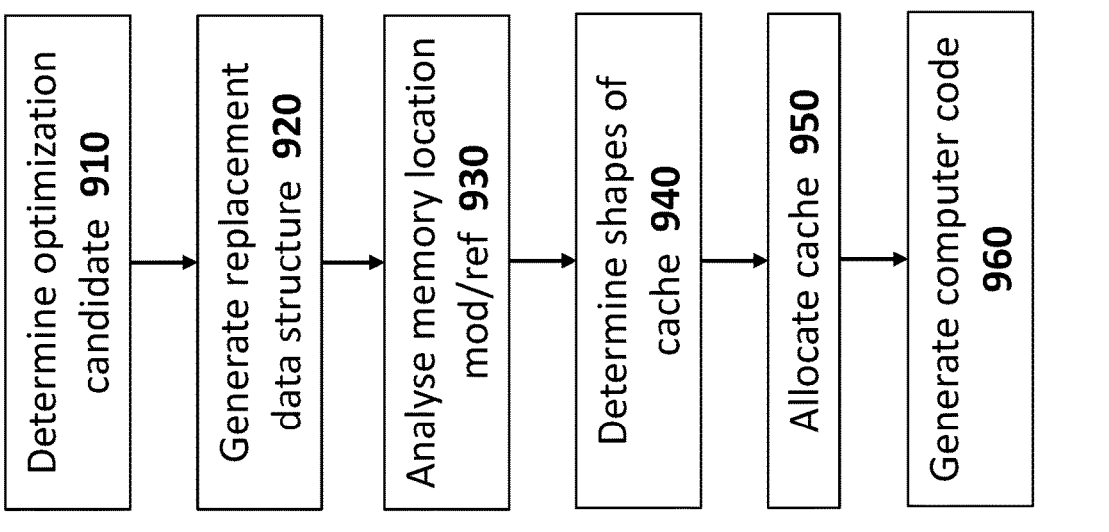
FIG. 9 illustrates a method for compiler optimization according to embodiments of the present disclosure.

FIG. 9 illustrates a method for compiler optimization according to embodiments of the present disclosure. The method includes determining 910, in an intermediate representation (IR) of a computer program, one or more optimization candidates, each optimization candidate comprising a chain of two or more pointers ultimately referencing information stored in memory. For example, with reference to FIG. 4 and with additional reference to FIG. 3, index (i, j), includes a chain of pointers, starting from the object of class A, going through B_i pointer and ending at the D_j pointer. The D_j pointer is ultimately indicative of information stored in memory, as the D_j pointer is a reference to a datum stored in memory, wherein the pointer's value can be interpreted as a memory address. The method further includes generating 920, for the one or more optimization candidates, a replacement data structure ultimately indicative of the information stored in memory. For the one or more optimization candidates, the method further includes analyzing 930 memory location modification and reference (mod/ref) effects to determine feasibility of the one or more optimization candidates. For the one or more optimization candidates determined to be feasible, the method further includes determining 940 shapes for one or more caches to be associated with one or more optimization candidates determined to be feasible and allocating 950 the one or more caches for storing the replacement data structure ultimately indicative of the information stored in memory. The method further includes generating 960 computer code to write to, read from, or both write to and read from the one or more caches.

In some embodiments, determining of one or more optimization candidates is performed using a cost model or cost analysis which can be indicative of one or both of: the amount or frequency of usage of code involving the one or more optimization candidates and the potential for performance improvement resulting from using the replacement data structure in place of the one or more optimization candidates.

In some embodiments, analyzing memory location modification and reference (mod/ref) effects includes a pointer analysis. In some embodiments, analyzing memory location modification and reference (mod/refs) effects further includes evaluating load instructions. In some embodiments, determining shapes for one or more caches further includes determining a size of the one or more caches.

In some embodiments, the one or more optimization candidates form a flattened tree structure. In some embodiments, the method further includes determining dimensions and size associated with the flattened tree structure.

In view of the above, embodiments of the present disclosure provide for the transformation of code to generate a flattened tree. This may result in faster execution of the target program.

Also in view of the above, embodiments of the present disclosure provide for the calculation of the dimensions and size of flattened tree. This may facilitate the correct or desired behavior of the transformed program.

Also in view of the above, embodiments of the present disclosure provide for the partitioning of the set of all stores into three sets with respect to a given load. This provides for part of the analysis for correctness of the transformation.

Also in view of the above, embodiments of the present disclosure provide for a cost analysis to identify candidates for transformation. This may facilitate the transformation making the program faster, not slower.

Also in view of the above, embodiments of the present disclosure provide for checking requirements on load instructions as part of a legality check. This may facilitate the correct behavior of the transformed program.

Figure 10:
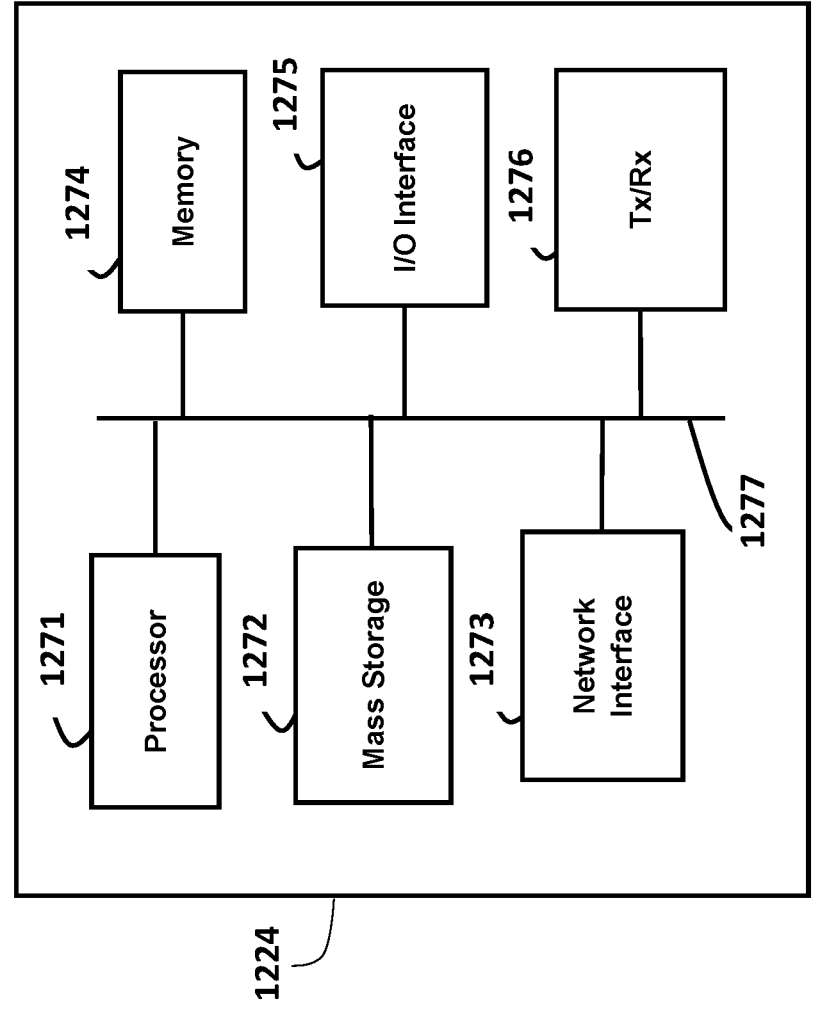
FIG. 10 illustrates an electronic device according to an embodiment of the present disclosure.

FIG. 10 is a block diagram of an electronic device 1224 which was denoted in the present disclosure as a networked device, apparatus or node. The device may comprise a computer processor operatively coupled to a computer memory. A computer equipped with network function may be configured as an electronic device. The device may correspond to parts of a computer server, for example in a datacenter, or a network node or networked or stand-alone computer.

As shown in FIG. 10, the device 1224 includes a processor 1271, such as a central processing unit (CPU) or specialized processors such as a graphics processing unit (GPU) or other such processor unit, memory 1274, non-transitory mass storage 1272, I/O interface 1275, network interface 1273, and a transceiver 1276, all of which are communicatively coupled via bi-directional bus 1277. According to certain embodiments, any or all of the depicted elements may be utilized, or only a subset of the elements. Further, the device 1224 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1274 may include any type of non-transitory memory such as static random access memory (SRAM), dynamic random access memory (DRAM), synchronous DRAM (SDRAM), read-only memory (ROM), any combination of such, or the like. The mass storage element 1272 may include any type of non-transitory storage device, such as a solid state drive, hard disk drive, a magnetic disk drive, an optical disk drive, USB drive, or any computer program product configured to store data and machine executable program code. According to certain embodiments, the memory 1274 or mass storage 1272 may have recorded thereon statements and instructions executable by the processor 1271 for performing any of the aforementioned method operations described above.

It is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology. Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device. Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for compiler optimization, the method comprising:

determining, in an intermediate representation (IR) of a computer program, one or more optimization candidates, each optimization candidate comprising a chain of two or more pointers ultimately referencing information stored in memory;

generating, for the one or more optimization candidates, a replacement data structure ultimately indicative of the information stored in memory;

for the one or more optimization candidates, analyzing memory location modification and reference (mod/ref) effects to determine feasibility of replacing the chain with a flattened data structure for the one or more optimization candidates;

for the one or more optimization candidates determined to be feasible, determining shapes for one or more caches to be associated with one or more optimization candidates determined to be feasible and allocating the one or more caches for storing the replacement data structure ultimately indicative of the information stored in memory; and generating computer code to write to, read from, or both write to and read from the one or more caches.

2. The method of claim 1, wherein determining one or more optimization candidates is performed using a cost model indicative of one or both of:

amount or frequency of usage of code involving the one or more optimization candidates; and potential for performance improvement resulting from using the replacement data structure in place of the one or more optimization candidates.

3. The method of claim 1, wherein analyzing memory location modification and reference (mod/ref) effects includes a pointer analysis.

4. The method of claim 1, wherein analyzing memory location modification and reference (mod/refs) effects further includes evaluating load instructions.

5. The method of claim 1, wherein determining shapes for one or more caches further includes determining a size of the one or more caches.

6. The method of claim 1, wherein the one or more optimization candidates form a flattened tree structure.

7. The method of claim 6, further comprising determining dimensions and size associated with the flattened tree structure.

8. An apparatus for compiler optimization, the apparatus comprising:

a processor; and a memory having machine executable instructions stored thereon, the instructions when executed by the processor configure the apparatus to:

determine, in an intermediate representation (IR) of a computer program, one or more optimization candidates, each optimization candidate comprising a chain of two or more pointers ultimately referencing information stored in memory;

generate, for the one or more optimization candidates, a replacement data structure ultimately indicative of the information stored in memory;

for the one or more optimization candidates, analyze memory location modification and reference (mod/ref) effects to determine feasibility of replacing the chain with a flattened data structure for the one or more optimization candidates;

for the one or more optimization candidates determined to be feasible, determine shapes for one or more caches to be associated with one or more optimization candidates determined to be feasible and allocating the one or more caches for storing the replacement data structure ultimately indicative of the information stored in memory; and generate computer code to write to, read from, or both write to and read from the one or more caches.

9. The apparatus of claim 8, wherein determining one or more optimization candidates is performed using a cost model indicative of one or both of:

amount or frequency of usage of code involving the one or more optimization candidates; and potential for performance improvement resulting from using the replacement data structure in place of the one or more optimization candidates.

10. The apparatus of claim 8, wherein analyzing memory location modification and reference (mod/ref) effects includes a pointer analysis.

11. The apparatus of claim 8, wherein analyzing memory location modification and reference (mod/refs) effects further includes evaluating load instructions.

12. The apparatus of claim 8, wherein determining shapes for one or more caches further includes determining a size of the one or more caches.

13. The apparatus of claim 8, wherein the one or more optimization candidates form a flattened tree structure.

14. The apparatus of claim 13, wherein the instructions when executed by the processor further configure the apparatus to determine dimensions and size associated with the flattened tree structure.

15. A computer program product comprising a non-transitory computer readable medium storing computer executable instructions thereon that when executed by a computer perform the method for compiler optimization, the method comprising:

determining, in an intermediate representation (IR) of a computer program, one or more optimization candidates, each optimization candidate comprising a chain of two or more pointers ultimately referencing information stored in memory;

generating, for the one or more optimization candidates, a replacement data structure ultimately indicative of the information stored in memory;

for the one or more optimization candidates, analyzing memory location modification and reference (mod/ref) effects to determine feasibility of replacing the chain with a flattened data structure for the one or more optimization candidates;

for the one or more optimization candidates determined to be feasible, determining shapes for one or more caches to be associated with one or more optimization candidates determined to be feasible and allocating the one or more caches for storing the replacement data structure ultimately indicative of the information stored in memory; and generating computer code to write to, read from, or both write to and read from the one or more caches.

* * * * *